United States Patent [19]

Dilworth

[11] 4,062,253
[45] Dec. 13, 1977

[54] CHAIN SAW SHARPENER
[75] Inventor: John Lewis Dilworth, Santa Monica, Calif.
[73] Assignee: McCulloch Corporation, Los Angeles, Calif.
[21] Appl. No.: 694,578
[22] Filed: June 10, 1976
[51] Int. Cl.² .................................................. B23D 63/16
[52] U.S. Cl. ............................................. 76/25 A; 30/139
[58] Field of Search .................... 76/25 A, 37; 30/138, 30/139; 51/246

[56] References Cited
U.S. PATENT DOCUMENTS
3,138,973 6/1964 Muir .......................................... 76/37
3,596,689 8/1971 Oehrili ...................................... 30/168

Primary Examiner—Harold D. Whitehead
Assistant Examiner—Roscoe V. Parker
Attorney, Agent, or Firm—Kenway & Jenney

[57] ABSTRACT

A chain saw sharpener is provided for sharpening the teeth of a cutting chain during operation of the chain saw. The sharpening system includes a housing mounted in the chain saw engine shroud and projecting both interior of and exterior of that shroud. A bushing is splined within the housing and the arbor of a grinding stone is rotatably supported in the bushing. The bushing and grinding stone are movable with respect to the fixed housing between a first position in which the grinding stone is remote from the cutting chain teeth and a second position in which the grinding stone is positioned for contact with cutting edges of the chain teeth as they travel in their fixed path around a sprocket within the shroud. A manually depressable knob is threadably engaged with the bushing and includes a stop surface engagable with the housing to define the second position of the grinding stone. The positioning of that stop surface with respect to the housing is adjustable by the threaded engagement of the knob with the bushing. A chosen position is maintained by a free-floating detent member disposed around the bushing within the housing and engaging a serrated surface of the knob. The detent, and thus the knob, the bushing, and the grinding stone, are biased by a spring within the housing urging all those items toward a position in which the grinding stone is retracted from the cutting chain.

15 Claims, 4 Drawing Figures

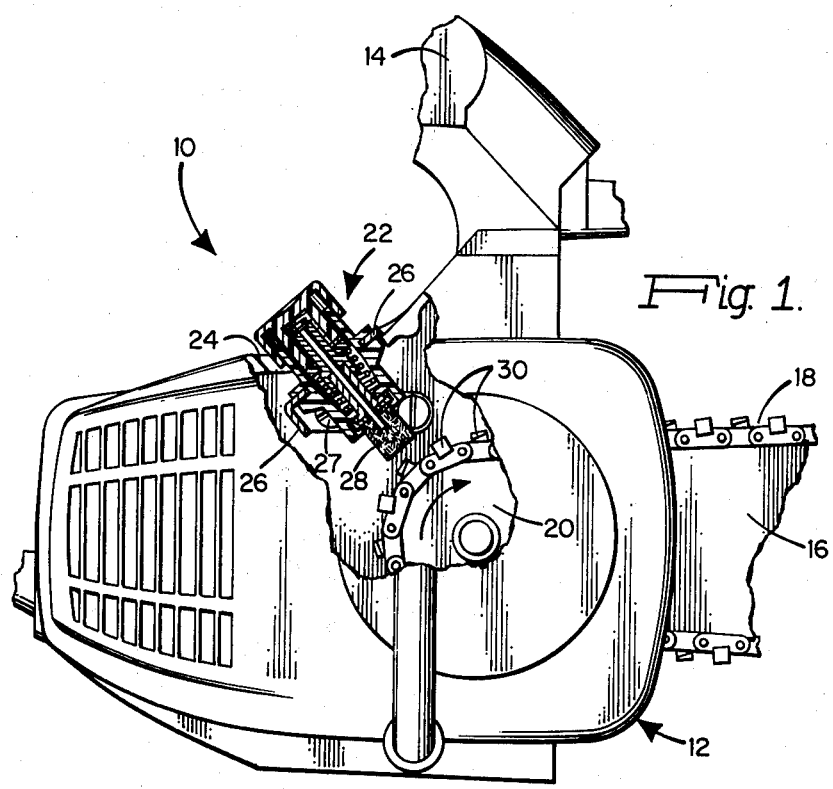
Fig. 1.
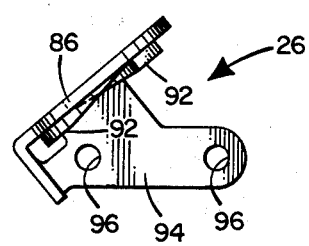
Fig. 3A.
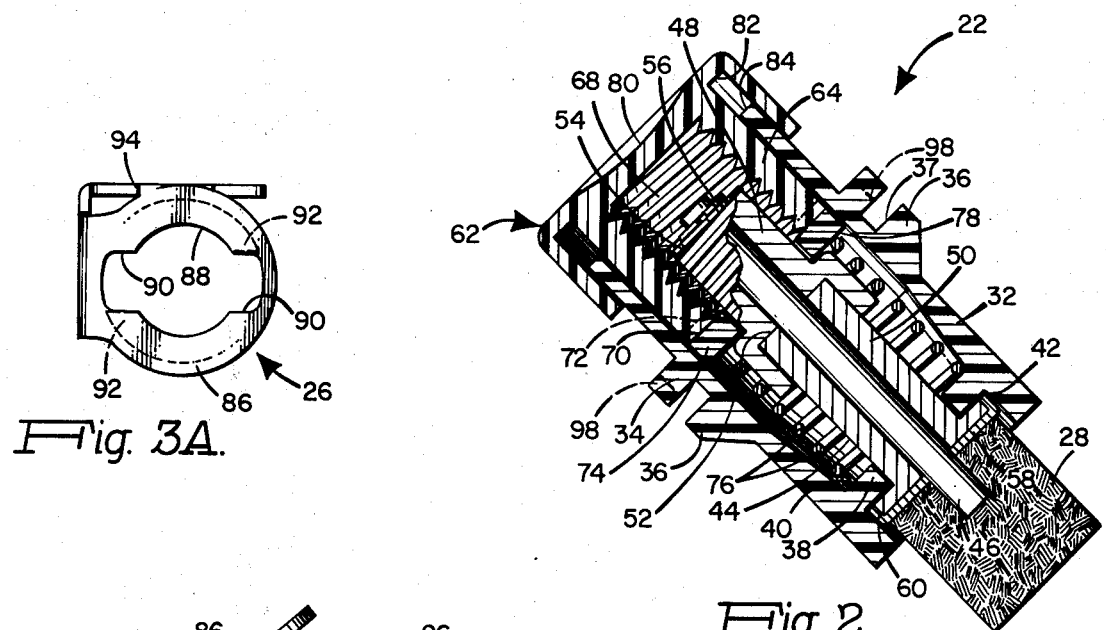
Fig. 2.
Fig. 3B.

CHAIN SAW SHARPENER

BACKGROUND OF THE INVENTION

This invention relates to a sharpening system for saw chains and, in particular, to such a sharpening system for sharpening the cutters on saw chain as that chain is being driven by the chain saw motor means.

There have been numerous proposals for saw chain sharpening devices mounted directly upon a chain saw to eliminate hand-filing of the chain cutters. Examples of such proposals can be found in the following patents: Muir U.S. Pat. No. 3,138,973; Tupper U.S. Pat. No. 3,465,795; Oehrli U.S. Pat. No. 3,260,287; and Oehrli U.S. Pat. No. 3,301,098.

Of the numerous prior suggestions, many have involved a provision of a grinding stone that is manually movable from a retracted position to a position for engagement with the cutters on a moving saw chain. Commercial acceptability of such systems has been quite limited for a number of reasons. Principal among such reasons has been the difficulty of achieving an inexpensive sharpener assembly that is capable of very precise positioning of the grinding stone relative to the chain cutters. Other difficulties have included the fouling of elements of the sharpener assembly by saw dust or other debris, thereby interfering with its proper operation at the time that sharpening of the cutters is required.

OBJECTS AND SUMMARY OF THE INVENTION

In view of the above discussion, it is a principal object of the present invention to provide a cutter sharpener system for incorporation into a chain saw which substantially overcomes various of the problems mentioned. It is a more particular object of the present invention to provide such a sharpening arrangement which is relatively inexpensive and efficient to manufacture, install, use, and replace.

To achieve these objects, the invention herein features improvements in a chain saw comprising an engine shroud, a drive sprocket within the engine shroud, a cutting chain trained about the drive sprocket, and a cutting chain sharpener assembly. The sharpener assembly includes a grinding stone supported for movement between first and second positions. In the former position the grinding stone is spaced apart from the cutting chain and in the latter position the grinding stone is disposed to contact cutters of the cutting chain for the sharpening thereof. Biasing means bias the grinding stone toward its first position (i.e., the position in which it is spaced apart from the cutting chain). In such a chain saw, there is provided an improved sharpener assembly further including a sharpener housing that is fixed with respect to the engine shroud and that has a portion interior of the shroud and a portion exterior of the shroud. An adjustable stop means is provided for defining the second position of the grinding stone and detent means are provided within the housing for maintaining the adjustable stop means in any selected position. Preferably, the grinding stone has a head mounted upon an arbor that is rotatably supported within a bushing, the bushing itself splined within the housing for longitudinal movement therein.

The adjustable stop means preferably comprise a knob that is threadably engaged with the bushing and that has portions exterior of the housing disposed to receive manual pressure to move the grinding stone from the retracted position to the sharpening position. The location of the second position is defined by mating surfaces of the knob and the housing that define a stop. The spacing of those surfaces, and thus the positioning of the grinding stone in the second position, are adjustable by the threaded engagement of the knob with the bushing. A floating detent within the housing is splined to the bushing and has serrations for engaging similar serrations on the knob.

Another feature of the sharpening assembly is the provision of a simple and effective seal against debris entering the housing. In the preferred construction, the substantially cylindrical housing includes an inwardly directed annular surface within the engine shroud disposed to engage a mating surface on the grinding stone support structure that preferably comprises the abovementioned bushing splined within the housing. In the preferred embodiment, a washer disposed intermediate the bushing and the grinding stone head has a perpheral flange disposed to engage the annular housing surface when the grinding stone is in the first position, thereby sealing the remainder of the housing against the entrance of debris.

Other desirable features and constructional details of the improved sharpening system according to the present invention will become apparant from the description below, together with the accompanying drawings of a particular prefereed embodiment.

THE DRAWINGS

FIG. 1 is a partially broken away elevational view of a portion of a chain saw incorporating a sharpener constructed and arranged in accordance with the present invention;

FIG. 2 is an enlarged view of the sharpener illustrated in FIG. 1; and

FIGS. 3A and 3B are plan and side elevational views of a mounting bracket for the sharpener of FIG. 2.

DETAILED DESCRIPTION OF A PARTICULAR PREFERRED EMBODIMENT

FIG. 1 illustrates a partially broken-away fragmentary view of a chain saw 10 comprising an engine shroud 12, a handle 14, and a blade 16. The blade 16 serves as a guide for a cutting chain 18 that is trained about a sprocket 20 within the shroud 12. The sprocket 20 is driven in a conventional fashion by chain saw engine means disposed within the shroud 12. A cutting chain sharpener assembly 22 is mounted in an opening 24 provided in the shroud 12 and is supported in a fixed position by a bracket 26 that is rigidly secured (e.g., by screws 27) to interior portions of the shroud 12. The sharpener assembly 22 includes a rotatable grinding stone assembly, including a grinding stone head 28, supported (as further described below) for movement between a retracted position (as illustrated in FIG. 1) and an advanced position in which it can contact cutters 30 of the chain 18. In the illustrated embodiment, the chain 18 is of the "top-sharpening" variety and the grinding stone head 28 is supported for movement to an advanced position for engagement with the outer or "top" surfaces of the cutters 30. (Top-sharpening chains are well-known in the art and an example of such a chain can be found in above-mentioned Muir U.S. Pat. No. 3,138,973.)

Details of the sharpener assembly 22 are best described with reference to FIG. 2. The assembly includes a generally cylindrical housing 32 that includes a radial exterior flange 34, a pair of diametrically opposed keys 36 that extend outwardly from the housing at a location near the flange 34, and an inwardly extending flange 38 that includes opposed bearing surfaces 40 and 42.

A grinding stone assembly 44 is partially disposed within the housing and comprises the grinding stone head 28 mounted on an arbor 46 that is rotatably supported in bushing means comprising an upper bushing 48 and a lower bushing 50. The upper and lower bushings are pressed and keyed or cemented together as at 52 and a washer 54 and retainer clip 56 retain the arbor 46 within the bushing assembly. A second washer 58 having a bent or cupped peripheral flange portion 60 is cemented to the grinding stone head 28. In the retracted position of the grinding stone (as illustrated in FIGS. 1 and 2), the peripheral flange 60 of washer 58 is in engagement with the surface 42 of internal housing flange 38 around the entire circumference thereof.

The sharpener assembly 22 also includes a knob 62 that includes a central portion 64 disposed within the upper portion 66 of the housing 32 and being internally threaded, as at 68, for threaded engaged with the externally threaded upper bushing 48. A serrated lower surface 70 of the portion 64 engages a mating serrated surface 72 of a disc-shaped detent member 74 disposed within the housing surrounding the upper bushing 48. A non-circular cross section of bushing 48 and the hole though detent member 74 splines the member 74 to bushing 48. A similar hole in flange 38 and shape of lower bushing 50, splines the entire assembly in the housing 32, thereby permitting only longitudinal movement within the housing.

A compression spring 76 is disposed between the annular surface 40 of housing flange 38 and the lower surface 78 of the detent member 74. Since the housing 32 is fixed with respect to the mounting bracket and engine shroud, the spring 76 biases the assembly comprising detent 74, knob 62, bushings 48 and 50, arbor 46, and grinding stone head 28 toward the retracted position as illustrated in FIGS. 1 and 2.

The knob 62 preferably includes a recessed upper surface 80 to facilitate convenient manual (e.g., thumb) pressure on the knob and an internal annular surface 82 aligned with the annular end surface 84 of the cylindrical upper portion 66 of housing 32. As further explained below, engagement of the surfaces 82 and 84 define the second, or advanced position of the grinding stone head 28 in which actual sharpening of the chain cutters 30 is achieved.

As mentioned above in connection with FIG. 1, the mounting bracket 26, which supports the sharpener assembly housing 32, is itself supported in the opening 24 in engine shroud 12 by a pair of screws 27 (only one of which is visible in FIG. 1) that secure the bracket 26 to the entire structure. The structure of bracket 26 will be better understood by reference to FIGS. 3A and 3B, which are plan and side elevational views of the bracket alone. The bracket includes a generally planar plate 86 having a central, generally circular opening 88 that is sized to receive the cylindrical housing 32. A pair of diametrically opposed keyways 90 communicate with the generally circular opening 88 and are disposed to receive the keys 36 (see FIG. 2) that are integral with the housing 32. A pair of cam surfaces 92 are provided on the lower side of the plate 86 and are inclined with respect to the plane of 86. A support arm 94 having openings 96 for receiving screws 27 (see FIG. 1) is integral with the plate 86. The arm 94 is shaped, and the openings 96 are positioned, such that the plate 86 of the bracket is generally flush with the opening 24 in the engine shroud 12 (see FIG. 1).

With the bracket fixed in place on the engine shroud, the sharpener assembly housing 32 is secured to the bracket by inserting the lower portion of housing 32 into the opening 88 of the bracket with the keys 36 on the housing aligned with keyways 90 of the bracket. The housing is lowered until the flange 34 of the housing, which has a larger diameter than that of opening 88 in the bracket, engages the upper surface of bracket plate 86. The spacing, along the axis of the housing 32, between the flange 34 and the keys 36 is slightly more than the thickness of the plate 86 so that the upper surfaces 37 of the keys 36 are positioned below the plate 86. Rotation of the housing 32 then causes those surfaces 37 to engage the cam surfaces 92 beneath the plate 86, thereby causing the housing to be firmly retained to the bracket. The flange 34 preferably includes a series of peripheral notches 98 (see FIG. 2) thereby facilitating the use of a tool (e.g., a screw driver) to assist in the rotation of the housing. Those same notches 98, of course, facilitate the use of a tool in rotation of the housing in the opposite direction when the sharpener assembly is to be removed from the bracket.

With the housing retained in the bracket 26 as shown in FIG. 1, the threaded engagement of the knob 62 with the upper bushing 48 can be set such that the grinding stone head 28 will be properly positioned for sharpening chain cutters 30 when the knob is pushed downwardly against the force of spring 76 until the annular surface 82 of the knob 62 engages the outer edge 84 of the cylindrical housing. As is known in the art, the axis of the grinding stone is preferably offset from the center line of the cutting chain 18. This arrangement, of course, permits the cutting stone head 28 to rotate under the influence of forces experienced from the cutters 30, thereby preventing asymmetrical wear of the head 28. Additionally, with certain cutter 30 styles, the axis of the grinding stone should be slightly (e.g., 2 mm or less) below the axis of sprocket 20.

The engagement of serrations 72 on detent member 74 with serrations 70 on the knob portion 64 combine with the non-rotatable retention of the detent member 74 to prevent the knob 62 from changing its orientation relative to the bushing 48. After a sharpening operation, a small amount of material have been worn away from the lower face of grinding stone head 28 and a small amount of metal will have been ground from the appropriate surfaces of cutters 30. It is thus desirable to adjust the sharpener assembly such that, when a subsequent sharpening operation is required, the second, or advanced, position of the grinding stone will be slightly farther toward the cutters 30 than was that position in the previous sharpening operation. This is accomplished by rotating the knob 62 one "click" with respect to the detent. The knob is thus held in the new position by the detent but is positioned such that the surfaces 82 and 84 are slightly further apart than they previously were, thus resulting in a slightly more advanced second position of the grinding stone head 28 when the knob is depressed until surfaces 82 and 84 abut. The amount of such advance is determined by the pitch of the threads on the upper bushing 48 and the knob 62, as well as by the circumferential spacing of the serrations on the detent member 74 and the knob portion 64. For any given top-sharpening cutting chain design, these parameters can be chosen such that rotation of the knob 62 in the amount of one click relative to the detent member 74 results in an adjustment of the sharpening stone head position just sufficient to compensate for the wearing of the head 28 and the cutters 30 in the previous sharpening operation.

As is evident from the preceding discussion, a sharpening assembly constructed in accordance with the present invention is easy to mount in a chain saw and permits quite accurate adjustment in the positioning of the grinding stone for proper sharpening despite a design that requires very few, and relatively inexpensive, parts. In one preferred embodiment, for example, the housing 32, knob 62, and detent member 74 are molded from acetal, while the bushings 48 and 50 are molded from a related polymeric material commercially available under the name "Nylatron G. S."

When the grinding stone head 28 has become excessively worn through repeated sharpening operations, its replacement is a relatively simple matter. The sharpener assembly 22 is first removed from the bracket 26 and the knob 62 is unscrewed from the bushing 48, thereby exposing the retaining ring 56. The retaining ring 56 and washer 54 are then removed from the grinding stone arbor 46, which is then removed from the bushing assembly. The arbor of a new stone is then inserted into the bushing assembly and the washer retaining ring reinstalled on the end of the arbor. The knob 62 is then screwed back on to the bushing 48 and the housing 32 re-installed in the bracket 26. Alternatively, because the entire sharpener assembly 22 is so inexpensive to manufacture, owing to its design, the entire assembly 22 can be replaced rather than merely the grinding stone.

Another advantage of the relatively simple construction of a sharpener assembly according to the present invention is its light weight. For example, a sharpener assembly constructed in accordance with FIGS. 1 and 2 is found to weigh about 40 grams, and the total unit, including mounting bracket 26 and screws 27, weighs about 57 grams.

As will be understood by those skilled in the art, if dirt or debris were to become lodged between the lower face of lower bushing 50 and the washer 58 that is cemented to the grinding stone head 28, free rotation of the grinding stone under the influence of forces transmitted by the cutting chain 18 would be hindered. The accumulation of dirt in this region is prevented, according to the present invention, by the cooperation of the flange portion 60 of washer 58 with the surface 42 of housing flange 38. Under the influence of the biasing spring 76, the flange portion 60 seals against the surface 42 thereby preventing the entrance of dirt, or other debris, into the housing beyond that point.

Another advantage of the present sharpener assembly concerns the elimination of wear of various assembly parts, as well as potential misalignment of parts, which can result from engine vibration. With an appropriately sized flange 60 on the washer 58, the force of spring 76 is transmitted from the detent 74 to the knob 62, to the upper bushing 48, through the retaining ring 56 to the arbor 46, through the arbor to the grinding stone head 28, and thence to the washer 58. Thus, when the sharpener assembly is not in operation, the grinding stone assembly is biased against the housing 32 which is itself securly retained in the bracket 26. This keeps the arbor 46 from vibrating around, or back and forth, in the bushings, which would tend to enlarge the bores therein. In fact, every movable part of the assembly is subjected to loading by the spring, which should substantially reduce wear from engine vibration.

SUMMARY OF PRINCIPAL ADVANTAGES OF THE INVENTION

As discussed in more detail above, the present invention provides a sharpening system for a chain saw that is inexpensive to manufacture, yet quite effective because of the precise positioning of the actual grinding stone relative to the chain cutters. The provision of a floating detent member protected within a housing and biased toward the actuator knob permits accurate, reproducible positioning of the grinding stone head when the actuator knob is manually depressed. The cooperation of an internal surface of the housing in a flanged or cupped washer adjacent the grinding stone head prevents dirt from interferring with the operation of the sharpener assembly and facilitates the biasing of all movable parts to firm "rest" positions when the sharpener is not in use.

While the invention has been described with reference to a particular embodiment, it will be appreciated by those skilled in the art that additions, deletions, modifications, and substitutions or other changes not specifically described may be made which will fall within the scope of the appended claims.

What is claimed is:

1. In a chain saw comprising
   an engine shroud,
   a drive sprocket within said engine shroud,
   a cutting chain trained about said drive sprocket, and
   a cutting chain sharpener assembly including
      a grinding stone supported for movement between a first position in which said grinding stone is spaced apart from said cutting chain and a second position in which said grinding stone is located for contact with a cutting chain portion engaging said drive sprocket, and
      biasing means for biasing said grinding stone toward said first position
   the improvement wherein said chain sharpener assembly further comprises
   a sharpener housing fixed with respect to said shroud and having a portion interior of said shroud and a portion exterior of said shroud,
   an adjustable stop means for defining said second position of said grinding stone, and
   detent means within said housing for maintaining said adjustable stop means in a selected position.

2. In the chain saw of claim 1, the further improvement wherein said grinding stone is mounted upon an arbor rotatably supported within a bushing, said bushing supported in said housing for motion only in a direction parallel to said arbor, said adjustable stop means being threadably engaged with said bushing.

3. In the chain saw of claim 2, the further improvement wherein said stop means comprise an interior surface of a knob that is threadably engaged with said bushing within said housing and that has knob portions exterior of said housing for receiving manual pressure to move said grinding stone from said first position to said second position.

4. In the chain saw of claim 3, the further improvement wherein the portion of said housing adjacent said knob is substantially cylindrical, said knob including an interior annular surface disposed for engagement with the end of said cylindrical housing portion to define said second position of said grinding stone.

5. In the chain saw of claim 3, the further improvement wherein said knob includes a serrated surface, said detent means comprising a member having a serrated surface and positioned to be urged under the influence of said biasing means such that said two sets of serrations are engaged with each other.

6. In the chain saw of claim 5, the further improvement wherein said detent means comprise a member disposed for free longitudinal movement within said housing, said detent member engaging on one side said knob serrations and on the other side said biasing means.

7. In the chain saw of claim 6, the further improvement wherein said biasing means comprise compression spring means bearing against said housing and said detent member, respectively.

8. In the chain saw of claim 6, the further improvement wherein said detent member is splined to said bushing.

9. In the chain saw of claim 1, the further improvement wherein said housing is supported in an opening in said shroud by bracket means said housing and said bracket means shaped such that said bracket means are releasably engageable with said housing, whereby said housing may be removed from said shroud, for replacement thereof, from the exterior of said shroud.

10. In the chain saw of claim 9, the further improvement wherein said bracket includes a circular central opening and a keyway, said housing having a substantially cylindrical exterior surface sized to fit in the circular opening of said bracket, a key projecting from that exterior cylindrical surface sized to be received in said keyway, and a flange having diameter larger than that of said central opening in said bracket;

thereby enabling the mounting of said housing in said bracket by insertion of said key in said keyway and rotation of said housing with respect to said bracket.

11. In the chain saw of claim 10, the further improvement wherein said bracket includes a cam surface disposed for engagement with a portion of said key of said housing and shaped to result in an increasingly tighter retention of said housing to said bracket as said key travels along said cam surface.

12. In the chain saw of claim 11, the further improvement wherein said flange includes recesses in a peripheral portion thereof; thereby enabling the use of a tool to facilitate loosening and tightening of said housing despite the frictional engagement of said key with said cam surface.

13. In the chain saw of claim 1, the further improvement wherein grinding stone support means rotatably support said grinding stone for the longitudinal movement relative to said housing, said housing further including an inwardly-directed annular stop surface interior with the remainder of said housing and disposed to engage a surface of said grinding stone support means to define said first position of said grinding stone.

14. In the chain saw of claim 13, the further improvement wherein said grinding stone includes an arbor, said grinding stone support means comprising a bushing for rotatably receiving said arbor and a washer intermediate said bushing and the head of said grinding stone.

15. In the chain saw of claim 14, the further improvement wherein said washer includes a peripheral flange engagable with said annular housing surface, thereby sealing the remainder of the interior of said housing against the entrance of debris when said grinding stone is in said first position.

* * * * *